Oct. 13, 1964    J. E. WORSFOLD, JR    3,152,738
CAMERA CARRYING MEANS
Filed March 30, 1962

INVENTOR.
JOHN EDMUND WORSFOLD, JR.
BY Howson & Howson
ATTYS.

3,152,738
CAMERA CARRYING MEANS
John E. Worsfold, Jr., 1504 Winford Road,
Baltimore, Md.
Filed Mar. 30, 1962, Ser. No. 183,778
2 Claims. (Cl. 224—5)

The present invention relates generally to devices for carrying cameras, binoculars and the like, and more particularly to such a device which is adapted to resiliently secure the carried instrument in a protected position while holding the instrument available for immediate use.

A long-existent problem for active photographers and sportsmen has been the unsatisfactory conventional arrangement of carrying cameras and binoculars by means of a single neck strap. Such an arrangement invariably permits the instrument to swing forward or sideward upon even slight movements of the carrier. To avoid damage to the instrument and to minimize discomfort, the carrier must grasp the instrument in one or both hands while engaging in other than sedentary activities. Those engaged in hunting, fishing, hiking, sailing or a great number of other recreations, cannot carry a camera or binoculars in the conventional manner during such activity without interfering with such activity and risking possible serious injury to the instrument.

As a solution to the above difficulty, it is a first object of the present invention to provide a carrying means for cameras and the like which will resiliently secure the instrument to the carrier's body under all conditions of body movement.

A further object of the invention is to provide such a carrying means which permits immediate positioning of the instrument for use, such as at eye level or waist level, and additionally provides support for the instrument in such a position.

Another object of the invention is to provide a carrying means as described which is adapted to protect a carried instrument from damage as well as theft.

An additional object of the invention is to provide a carrying means as described which is adjustable as to size and as to the position at which it supports an instrument, and which is adapted to secure an instrument securely against either the chest or back of the carrier.

The present invention in realizing these and other objects includes elastic tension members passing over the shoulders of the carrier and under the carrier's arms, and means securing the ends of the tension members to an instrument, thus resiliently securing the instrument against the carrier. Adjusting means may be provided to vary the length of the tension members and thus vary the rest position at which the instrument is carried. The elastic tension members permit movement of the instrument for use such as to eye level or waist level in which positions the tension members, by exerting a constant elastic force on the instrument, serve to provide a steadying influence.

Additional objects and advantages of the invention will be more readily apparent from the following detailed description of an embodiment thereof when taken with the accompanying drawings in which.

Figure 1:
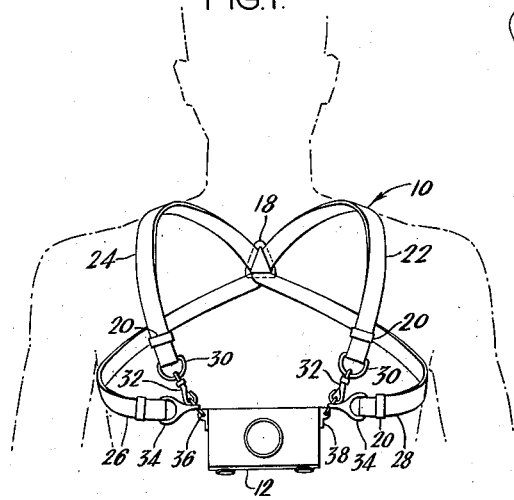
FIG. 1 is an elevational view showing the disposition of an embodiment of the invention as it would appear in supporting a camera in the rest position.

Referring to the drawings, FIG. 1 shows a camera carrying means in accordance with the invention generally designated 10 supporting a camera 12. Although the invention may be readily adapted for use with a variety of instruments such as still cameras, movie cameras, binoculars and the like, for purposes of illustration and not as a limitation on the scope of the invention, a camera of a familiar type is shown in the drawings in connection with the preferred embodiment.

Figure 4:
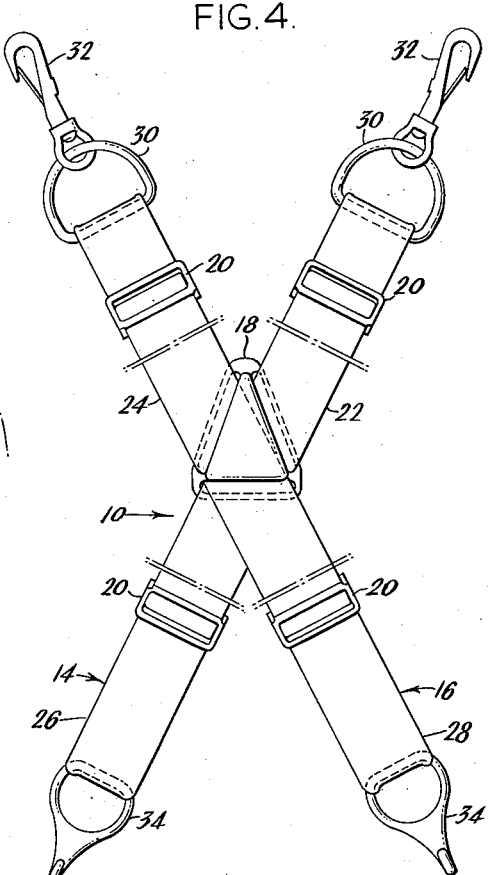
FIG. 4 is a plan view of the interior of the embodiment as it would appear when spread out on a flat surface.
Figure 6:
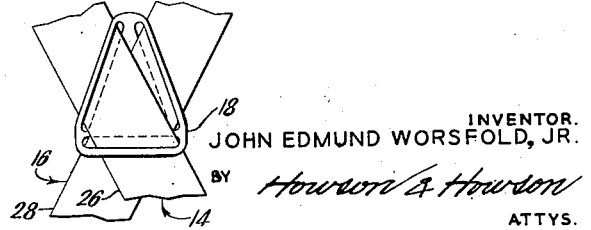
FIG. 6 is a fragmentary view showing the manner in which the elastic tension members are adjustably connected.

As shown in FIG. 4, the carrying means 10 comprises a pair of elastic bands 14 and 16 which are adjustably secured in crossed relation by slotted fastening 18 of a conventional type. The view of FIG. 6 more clearly shows the overlapping disposition of the bands in the fastening 18. The ends of the bands are doubled back and secured by means of conventional slidable adjusters 20.

The crossed bands provide two sets of diverging band straps, the upper or shoulder straps 22 and 24, and the lower or underarm straps 26 and 28. Loops formed by the doubled-back strap ends provide means for securing the fastenings required to attach the strap ends to the camera 12. D rings 30 are secured to the shoulder strap and loops, with swivel spring clips 32 being slidably mounted on the D rings. Hooks 34 are secured to the end loops of the underarm straps 26 and 28.

Figure 2:
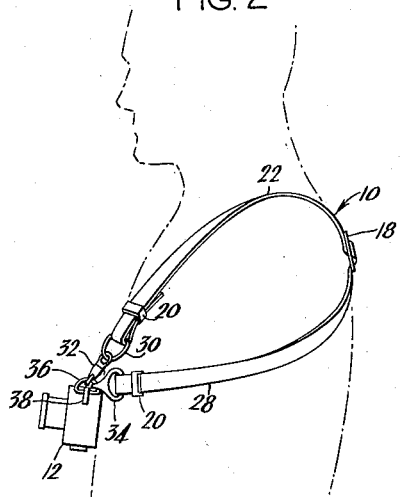
FIG. 2 is a side elevation of the embodiment in the rest position.
Figure 5:
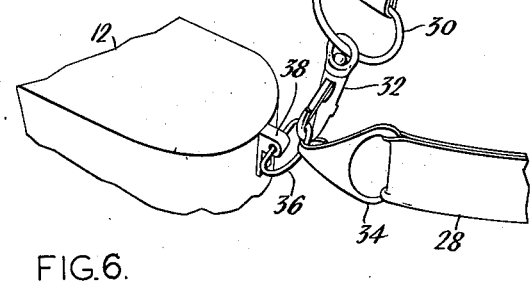
FIG. 5 is an enlarged fragmentary perspective view showing the details of attachment of the embodiment to a camera.

In operation, the carrying means is worn in the manner shown in FIGS. 1 and 2. The shoulder straps 22 and 24 are passed over the shoulders of the wearer and the swivel clips 32 are attached to D rings 36 secured to bosses 38 on the camera 12. The underarm straps 26 and 28 are passed under the arms of the wearer and the hooks 34 are engaged with D rings 36 in addition to the clips 32, the manner of attachment being clearly shown in FIGS. 1 and 5.

The elastic straps hold the camera firmly in place against the chest of the wearer in the rest or carrying position shown in FIGS. 1 and 2. Body movement of the wearer is unrestricted by the camera or the carrying means. The camera cannot swing away from the body upon even violent exertions of the wearer, but remains resiliently and comfortably supported.

Figure 3:
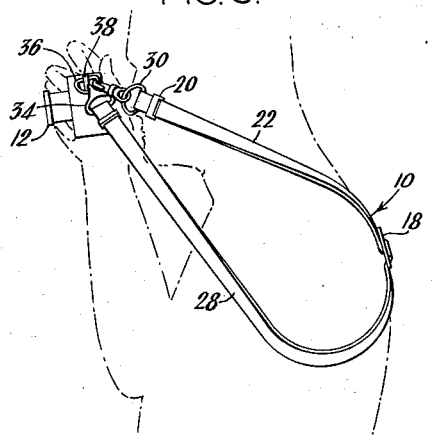
FIG. 3 is a view similar to FIG. 2 showing the embodiment bracing the camera in a raised position.

The camera when snugly secured and protected in the carrying position, is always ready for immediate use. The elasticity of the straps is such as to permit movement of the camera to its normal operating position, in the case of the camera 12 to the eye level position as shown in FIG. 3. The restraining force exerted by the extended elastic bands provides a desirable steadying influence on the camera, minimizing accidental movement thereof during use. The tension of the straps may of course, be adjusted by means of the slidable adjusters 20.

As indicated above, the carrying means permits waist level positioning of an instrument by extension of the elastic bands in a manner similar to that employed for eye level positioning. Reflex type cameras for example, may thus be effectively used with the invention, and the steadying effect noted above for eye level use is similarly provided at a lower position.

For certain activities such as mountain climbing or hunting it may be desirable to carry the instrument on the wearer's back rather than the chest. The carrying means is easily reversed and will carry an instrument securely and safely in the reversed position, although the instrument is not as readily usable in such position.

The elastic bands are preferably of woven elastic webbing of the type which extends longitudinally without lateral contraction. The fastenings are preferably of a non-corrosive or plated metal.

The band arrangement shown in the preferred embodiment may be modified such as by running each band over the shoulder and under the arm below, joining the bands at the back in a suitable manner.

Similarly, other changes in details of construction can be effected by those skilled in the art without departing from the spirit and scope of the invention as defined in and limited solely by the appended claims.

I claim:

1. In combination, an instrument, and a carrying means for said instrument adapted to resiliently support said instrument against the chest of the wearer of the carrying means and permitting selective eye level or waist level positioning for operation thereof, said carrying means comprising a pair of elastic bands, means joining said bands together at a point remote from the respective ends thereof, means on each of the ends of said bands for securing the ends to said instrument, said bands comprising a pair of shoulder strap portions and a pair of underarm strap portions, a shoulder strap portion and an underarm strap portion adapted for attachment to each side of the instrument, the length and elasticity of said bands being such as to provide, in the eye level and waist level positions, a steadying influence on the instrument by exerting a restraining force thereon.

2. In combination, an instrument having a carrying ring on each side thereof, and a carrying means for said instrument adapted to resiliently support said instrument against the chest of the wearer of the carrying means and permitting selective eye level or waist level positioning for operation thereof, said carrying means comprising a pair of elastic bands, means joining said bands together at a point remote from the respective ends thereof, hook means on each of the ends of said bands for securing the ends to said instrument, said bands comprising a pair of shoulder strap portions and a pair of underarm strap portions, the shoulder strap portions and underarm strap portions adapted to respectively pass over the shoulders and under the arms of the wearer for attachment to the sides of said instrument by means of said hook means engaging the instrument carrying rings, the length and elasticity of said bands being such as to provide, in the eye level and waist level positions, a steadying influence on the instrument by exerting a restraining force thereon.

References Cited in the file of this patent

UNITED STATES PATENTS

| | | |
|---|---|---|
| 673,074 | Brandform | Apr. 30, 1901 |
| 921,812 | Dorf | May 18, 1909 |
| 921,900 | Shuster | May 18, 1909 |
| 1,178,628 | Clawson | Apr. 11, 1916 |
| 2,441,115 | Lambert | May 14, 1948 |
| 2,643,803 | Bates | June 30, 1953 |

OTHER REFERENCES

American Machinist, page 542, July 12, 1939.